Aug. 8, 1933.   P. FENAILLE   1,921,737
UNIVERSAL COUPLING FOR MACHINE ELEMENTS
Filed Dec. 5, 1927
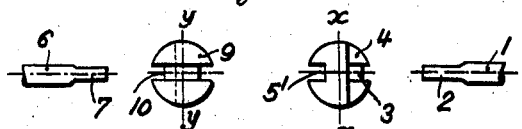
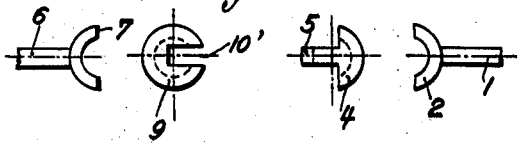
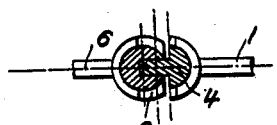
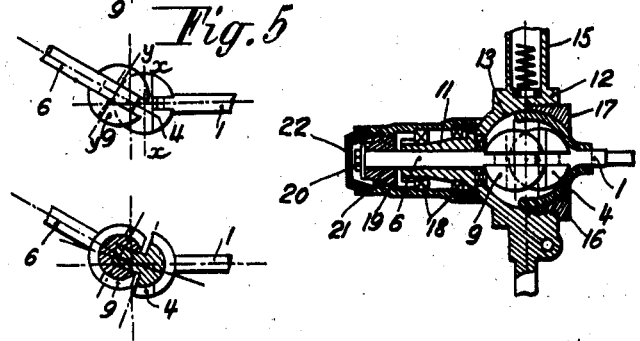
Inventor
Pierre Fenaille
By Addison A. Armstrong
Attorney Patented Aug. 8, 1933

1,921,737

UNITED STATES PATENT OFFICE 1,921,737

UNIVERSAL COUPLING FOR MACHINE ELEMENTS

Pierre Fenaille, Paris, France

Application December 5, 1927, Serial No. 237,952, and in France December 8, 1926

5 Claims. (Cl. 64—102)

My invention relates to improvements in universal couplings for machine elements and more particularly to a joint of the character indicated which is particularly applicable to the front wheel drive of an automobile or analogous vehicle.

One of the objects of the invention is to provide a universal coupling, which, when coupled to a drive shaft and a driven shaft will produce absolute synchronism between the said shafts irrespective of the angular position which the said shafts may occupy with respect to each other.

Another object of the invention is to provide a universal joint in which all pivots and crosspieces are eliminated and the driving connection is established by means of interlocking spherical members forming a continuous kinematic chain between the driving element and the driven element.

Still another object of the invention is to so arrange and enclose the elements forming the joint that they shall be readily adapted for insertion in the journal of a vehicle wheel to which the joint serves to transmit motive power.

Other objects of the invention will be obvious to those skilled in the art to which this invention relates with reference to the accompanying drawing forming part of this specification, and in which—

Fig. 1 is an elevational view of the four elements constituting the joint in dissembled relatoin;

Fig. 2 is a corresponding view of the said elements looking from beneath in Fig. 1;

Fig. 3 is a detail of a modification of the spherical complementary members of Figs. 1 and 2;

Fig. 4 is a view partly in section of the joint with the drive shaft and driven shaft in alignment, the joint being in assembled position;

Fig. 5 is an elevational view of the joint with the elements in assembled relation and the drive shaft and driven shaft disposed at an angle with respect to each other;

Fig. 6 is a view corresponding to Fig. 5 with the complementary spherical members shown in section; and Fig. 7 is a sectional view of the joint mounted in the journal of a vehicle wheel.

Referring to the drawing and more particularly to Figs. 1 and 2, the joint comprises a shaft 1, which for simplicity will be called the drive shaft, whose extremity terminates in an arcuate forked member 2. The said member 2 is made in the form of an arc of a circle extending through slightly more than 180° of circumference and embraces a circular groove 3 provided in a metallic sphere 4 forming one of the coupling elements of the joint. In assembling the sphere 4 is turned about its axis $x$—$x$ so that the member 2 may engage a portion of the groove 3 and subsequently turned in the reverse direction whereby the member 2 slides over and engages the bottom of the circular groove 3. In view of the fact that the member 2 embraces slightly more than 180° of arc on the circular bottom of the groove 3, the sphere 4 is securely coupled to the member 1 and permits considerable relative angular displacement without separation.

The rear portion of the sphere 4 is cut away to form a tenon 5 diametrically disposed at right angles to the groove 3 and is provided with a notch 5' disposed in line with the groove 3 which allows the member 2 to pass when rotating the sphere 4 in assembling.

A second shaft 6, which may be designated the driven shaft, is provided with a forked member 7 and is of precisely the same construction as that of shaft 1. A second spherical member 9 is provided with a circular groove extending clear around the circumference thereof as shown at 10. At right angles to the plane of said groove 10 is provided a second groove or mortise 10' adapted to slidably receive the tenon 5 of sphere 4.

Fig. 3 shows a modification in which two identical coupling spheres $9^a$ and $4^a$ are each provided with a plurality of inter locking mortises and tenons $10^a$ and $5^a$ respectively. The said spheres are otherwise similar to the spheres 4 and 9 previously described. This construction greatly reduces the cost of production inasmuch as the same sphere may be used as either member of the coupling.

The operation of the above described joint will be readily understood by those skilled in the art with reference to Figs. 4 to 6. Fig. 4 shows the drive shaft in alignment with the driven shaft, in which position, the shafts, the spheres and their coupling elements all revolve about the same axis. In Figs. 5 and 6 the said shafts are shown disposed at an angle with respect to each other. In this position when the shaft 1 is rotated the member 2 turns the sphere 4 about the axis of the said shaft. The motion of sphere 4 is transmitted to the sphere 9 through the medium of the tenon 5 and mortise 10' which in turn is transmitted to the shaft 6 through member 7 carried thereby. During this rotary movement the sphere 4 is rocked in the member 2 about its axis $x$—$x$ while the sphere 9 is rocked in the member 7 about its axis $y$—$y$ in a corresponding manner. The sliding connection consisting of the tenon 5 and the mortise 10' permits the spheres 4 and 9 to adjust themselves with respect to the angular displacement of their respective shafts but permits the pivotal axes x—x and y—y thereof to always remain in the same plane. The said axes being always in the same plane the shaft 6 must necessarily rotate at the same speed as shaft 1 and in synchronism therewith.

Fig. 7 shows the coupling mounted in the journal of a front wheel of a motor vehicle. As therein shown a wheel journal 12 is provided with a semicylindrical cavity 13 provided with a cylindrical interiorly threaded portion 14. Within the said cavity are housed the coupling spheres 4 and 9 of the joint. The said journal is carried by a suitable support 15 which is only shown in part since it forms no particular part of this invention.

The journal 12 is adapted to overlap an open spherical housing member 16 which is held in place by means of a threaded socket collar 17 engaging the threads 14 in the cavity 13 of journal 12.

The shaft 6 of sphere 9 extends through the journal 12 which carries the usual bearing rings 18 which in turn carry the wheel hub 19. The hub 19 is secured to the shaft 6 by means of a locking ring and a bolt 20. The extremity of hub 19 is closed by means of the usual hub cap 22. The operation of the coupling is the same as previously described. The housing construction not only permits an element of the vehicle wheel already in existance to be utilized therefore but also allows orientation of shafts 1 and 6 in all directions with respect to each other and at the same time provides a sturdy support for the wheel without interfering with the said orientation. The wheel may thus be moved about a vertical axis for steering purposes and at the same time may receive displacement in the vertical direction, such as when coming in contact with an object on the road, and in either case without the least disturbance of the synchronous rotation of the drive shaft 1 with the driven shaft 6 all of which contributes to a more efficient operation of the vehicle.

Having thus described my invention, what I claim as new and desire to secure by Letters Patent is:

1. A universal joint comprising, in combination: a member comprising a sphere cut away to provide a substantially semispherical portion with a substantially semicircular flange projecting therefrom; a second member comprising a sphere cut away to provide a substantially semispherical portion with arcuate edged flanges projecting therefrom, defining a groove therebetween to receive said first named flange; each of said members having a circumferential groove in a plane perpendicular to the plane of said flanges; and opposed shaft ends each carrying arcuate projections engaging the respective grooves.

2. A universal joint comprising, in combination: a member comprising a sphere cut away to provide a substantially semispherical portion with a substantially semicircular flange projecting therefrom; a second member comprising a sphere cut away to provide a substantially semispherical portion with arcuate edged flanges projecting therefrom, defining a groove therebetween to receive said first named flange; each of said members having a circumferential groove in a plane perpendicular to the plane of said flanges and continued through the ends of said flanges; and opposed shaft ends each carrying arcuate projections combinedly embracing in excess of 180° of arc, engaging the respective grooves; said grooved flange ends with the cut away portions permitting assembly of the projections in the grooves.

3. A universal joint comprising, in combination: a pair of like members each comprising a sphere cut away to provide a substantially semispherical portion with a plurality of semicircular flanges projecting therefrom separated by grooves slightly greater in width than the thickness of the flanges; said flanges and grooves so located as to be complementary upon the two members when one is reversed; said flanges and grooves on the respective members intermeshed; each member having a circumferential groove in a plane perpendicular to the planes of said flanges; and opposed shaft ends carrying arcuate projections located in the circumferential grooves of the respective members.

4. A universal joint comprising, in combination: a member comprising a sphere cut away to provide a substantially semispherical portion with a substantially semicircular flange projecting therefrom; a second member comprising a sphere cut away to provide a substantially semispherical portion with arcuate edged flanges projecting therefrom, defining a groove therebetween to receive said first named flange; each of said members having a circumferential groove in a plane perpendicular to the plane of said flanges; opposed shaft ends each carrying arcuate projections engaging the respective grooves, and means to so support said shaft ends that the axes of the shafts will constantly intersect in a point equally distant from the spherical centers of said semispherical members.

5. A universal joint comprising, in combination: a member comprising a sphere cut away to provide a substantially semispherical portion with a substantially semi-circular flange projecting therefrom; a second member comprising a sphere cut away to provide a substantially semispherical portion with arcuate edged flanges projecting therefrom, defining a groove therebetween to receive said first named flange; each of said members having a circumferential groove in a plane perpendicular to the plane of said flanges; opposed shaft ends each carrying arcuate projections engaging the respective grooves, a bearing for supporting one of the shaft ends, a hollow spherical element integral with said bearing, a second bearing supporting the other shaft end, and another hollow spherical element integral with said second bearing, and adapted to slide inside the first spherical element.

PIERRE FENAILLE.